March 22, 1938. J. DE MOOY 2,111,583

LUBRICATOR

Filed Sept. 16, 1935

JOHN DE MOOY
INVENTOR

BY John C. Renfer

ATTORNEY

Patented Mar. 22, 1938

2,111,583

UNITED STATES PATENT OFFICE 2,111,583

LUBRICATOR

John De Mooy, Shaker Heights, Ohio, assignor to The Cleveland Pneumatic Tool Company, Cleveland, Ohio, a corporation of Ohio Application September 16, 1935, Serial No. 40,676

4 Claims. (Cl. 184—55)

This invention relates broadly to lubricators, but more particularly to lubricator for fluid actuated machines.

One object of this invention is to produce an improved lubricator of simple construction, which is strong, durable, and efficient.

Another object of this invention is to provide a fluid actuated machine with a lubricator having means incorporated therein capable of filtering the lubricant before its admission to the moving parts of the machine.

Another object of this invention is to provide a lubricator for fluid actuated machines, which can readily be adjusted to control the amount of lubricant admitted to the working parts of the machine.

Other objects and advantages more or less ancillary to the foregoing reside in the specific construction and aggroupment of the elements peculiar to this structure, as will become apparent from a more complete examination of this specification.

Figures 1, 2:
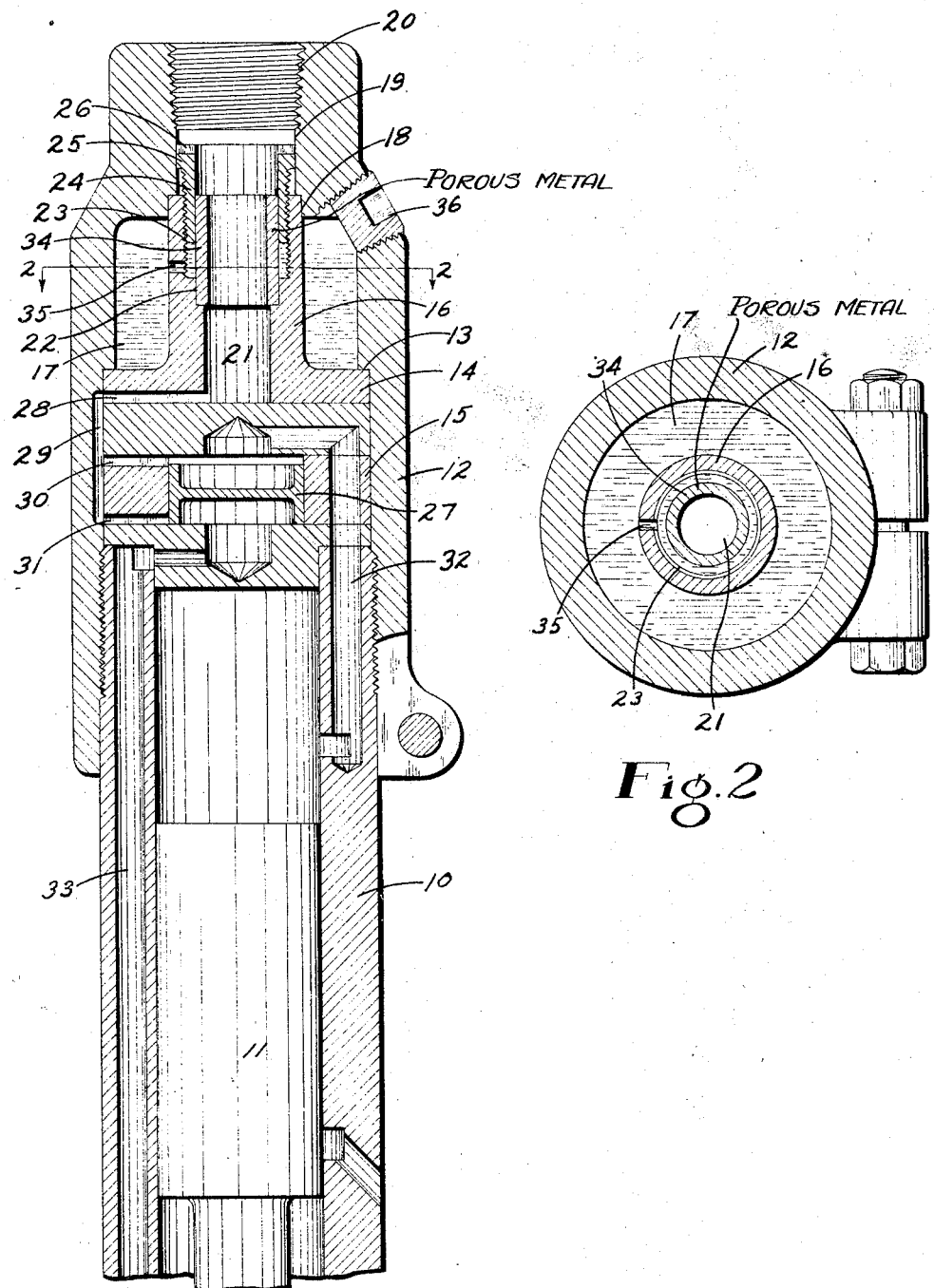
Fig. 1 is an elevational sectional view illustrating a portion of a fluid actuated machine having the invention applied thereto.
Fig. 2 is a cross sectional view taken through a plane indicated by line 2—2 in Fig. 1.

In this illustrative construction, 10 represents the cylinder of a fluid actuated machine having a hammer piston 11 reciprocable therein. Secured to the end of the cylinder in screw threaded relation therewith, there is a hollow head 12 formed with an internal annular shoulder 13. Between the end of the cylinder 10 and the shoulder 13, the head 12 is accurately machined to receive a plate 14 and valve block assembly 15, which are operatively clamped therebetween. The plate 14 has a stem 16 extending upwardly therefrom in spaced relation with a portion of the inner wall of the head 12, to form an annular chamber or reservoir 17. The free end of the stem 16 is snugly mounted within a counterbore 18 formed in the head 12, which communicates to the exterior thereof through a centrally disposed bore 19. This bore is threaded as at 20 to receive one end of a motive fluid conduit.

Formed through the stem 16, there is a bore 21 disposed in coaxial alignment with the bore 19 and extending through the plate 14. Toward the free end of the stem, this bore is enlarged to form counterbores 22 and 23, the latter being threaded to operatively receive a bushing 24 having a head 25 in slidable engagement with the inner wall of the bore 19, and provided with a screw driver slot 26.

Reciprocably mounted within the valve block assembly 15, there is a valve 27 having motive fluid admitted thereto from the bore 21, through a slot 28, port 29 and passages 30 and 31. From the valve, motive fluid may be admitted into the rear end of the cylinder 10 through a passage 32 and into the front end thereof via a passage 33, to actuate the piston 11.

Referring now more particularly to the present invention, 34 designates a sleeve having an internal wall constituting an outlet surface. This sleeve is located within the stem 16 with its front end snugly mounted within the counterbore 22. This sleeve or regulator extends into the bushing 24 in slidable fluid tight relation with the inner wall thereof. The sleeve 34 is made of porous metal, the purpose of which will be explained hereinafter. The counterbore 23 is in constant communication with the reservoir 17 through a port 35. The reservoir 17 may be filled with lubricant such as oil or liquid grease, by removing a filler plug 36.

Assuming that motive fluid is admitted into the bore 19 from a conduit secured to the machine by the threaded connection 20, and that the reservoir 17 is filled with lubricant, the operation of the device will be as follows: The motive fluid from the bore 19 is free to flow through the sleeve or regulator 34 into the bore 21, from where it is admitted to the valve 27 via the slot 28, port 29, and passages 30 and 31. From the valve 27, the motive fluid is alternatively admitted into the rear and front end of the cylinder 10 through the passages 32 and 33 respectively, to actuate the piston 11.

During the passage of the motive fluid through the sleeve 34, and especially when the pressure of the motive fluid therein is increased due to the piston 11 reaching the ends of its stroke and compressing the motive fluid within the corresponding end of the cylinder, the motive fluid will flow through the porous wall of the sleeve 34 into the counterbore 23, from where it is admitted into the reservoir 17, via the port 35. The movement of the piston 11 away from one end portion of the cylinder within which motive fluid is admitted, will permit the expansion of the motive fluid therein, thus causing a drop of pressure of the motive fluid flowing through the sleeve 34 and bore 21. The pressure of the motive fluid previously admitted into the reservoir 17 being at that instant higher than that of the motive fluid in the sleeve 34, will force the lubricant into the counterbore 23 through the port 35, and therefrom through the porous wall of the sleeve 34 from the external side thereof or inlet surface to the internal side or outlet surface of the wall, where it will mingle with the motive fluid and be carried thereby to the moving parts of the machine.

From the foregoing, it will be understood that the amount of the lubricant admitted into the motive fluid, is proportional to the area of the external wall of the sleeve 34, that is the inlet area, exposed to the lubricant. This area may be varied by rotating the bushing 24. For instance when it is desired to reduce the amount of the lubricant admitted into the motive fluid, the bushing 24 may be rotated to bring the front end thereof toward the bottom of the counterbore 23, reducing thereby the area of the external wall of the sleeve exposed to the lubricant. When it is desired to increase the amount of lubricant admitted into the motive fluid, the bushing 25 may be rotated to move the front end thereof away from the bottom of the counterbore 23, thus increasing the area of the sleeve exposed to the lubricant.

Due to the flow of the motive fluid back and forth through the wall of the sleeve 34, the pores formed in the wall of the sleeve are apt to be kept free from extraneous matter accidentally admitted in the lubricant or the motive fluid. However, in the event the pores should become obstructed sufficiently to prevent the passage of a predetermined amount of lubricant, the bushing may be rotated to expose a new area of the external wall of the sleeve to the lubricant.

From the foregoing, it will be seen that the present lubricator is of very simple construction, which is strong, durable, and efficient. It will further be understood that the amount of the lubricant admitted into the motive fluid may be regulated in a manner making the lubricator adaptable for any kind of fluid actuated machine, irrespective of the viscosity of the lubricant required.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a lubricator for a fluid actuated machine, a casing having motive fluid admitted therein, a reservoir having lubricant stored therein, means for conveying lubricant from said reservoir to said motive fluid including a wall formed of porous metal through which lubricant can flow, and means operable for selectively varying the size of the area of said wall through which lubricant can flow, thus selectively controlling the amount of lubricant conveyed from said reservoir to the motive fluid aforesaid.

2. In a lubricator for a fluid actuated machine, a casing having motive fluid admitted therein, a reservoir having lubricant stored therein, means for conveying lubricant from said reservoir to said motive fluid including a wall formed of porous metal having a surface exposed to the lubricant from where the latter can flow through said wall due to the poriferous characteristic of said metal to the motive fluid aforesaid, and adjustable means for varying the area of said surface, thus selectively controlling the amount of lubricant conveyed from said reservoir.

3. In a lubricator, a casing, a reservoir having lubricant stored therein, means for conveying lubricant from said reservoir, lubricant filtering means including a wall formed of porous material, said wall arranged and disposed in a manner whereby the lubricant is forced to pass through a portion thereof during its flow from said reservoir, and means for selectively subjecting another portion of said wall to the passage of the lubricant when the flow of the latter through said first mentioned portion has been restricted due to the obstruction thereof.

4. In a lubricator for a fluid actuated machine, a wall formed of porous metal having an inlet and an outlet surface, adjustable means for varying the effective area of said inlet surface, means for admitting lubricant to the inlet surface of said wall from where it is capable of flowing through the pores of the wall to the outlet surface thereof, and means for admitting motive fluid on said outlet surface for carrying the lubricant into the machine.

JOHN DE MOOY.